(12) United States Patent
Kirtley et al.

(10) Patent No.: US 7,463,242 B2
(45) Date of Patent: Dec. 9, 2008

(54) STATIONARY ERGONOMIC MOUSE

(76) Inventors: Donny Kevin Kirtley, 8744 FM 58, Lufkin, TX (US) 75901; Pamela Kay Kirtley, 8744 FM 58, Lufkin, TX (US) 75901

( * ) Notice: Subject to any disclaimer, the term of this patent is extended or adjusted under 35 U.S.C. 154(b) by 481 days.

(21) Appl. No.: 10/961,985

(22) Filed: Oct. 8, 2004

(65) Prior Publication Data
US 2006/0077177 A1 Apr. 13, 2006

(51) Int. Cl.
*G06F 3/033* (2006.01)
(52) U.S. Cl. .................................... 345/163; 345/161
(58) Field of Classification Search ............... 345/161, 345/163; 463/37, 38
See application file for complete search history.

(56) References Cited

U.S. PATENT DOCUMENTS

| | | | | |
|---|---|---|---|---|
| 6,104,383 | A * | 8/2000 | Shipman | 345/163 |
| 6,417,842 | B1 * | 7/2002 | Shattuck | 345/163 |
| 6,480,184 | B1 * | 11/2002 | Price | 345/163 |
| 7,055,025 | B2 * | 5/2006 | Chen | 713/1 |
| 2004/0025065 | A1 * | 2/2004 | Lou | 713/300 |

* cited by examiner

*Primary Examiner*—Amr Awad
*Assistant Examiner*—Dennis P Joseph
(74) *Attorney, Agent, or Firm*—Delphine James

(57) ABSTRACT

The present invention comprises a stationary wireless mouse for a computer system. The wireless mouse further comprises a casing defined by an upper surface, a left side, fight side, and a flat bottom surface area. The upper surface area further includes a raised crown portion dimension to accommodate the palm region of the hand. The upper surface area also includes a front section and a back section. Extending forward from the crown portion is the front section of the casing. Extending backward from the crown portion is the back section of the casing. A navigation stick is configured to generate precise on-screen cursor control movement key signals. The navigation stick is positioned in the upper left comer of the forward section of the casing for operation by the index finger. For a predetermined short distance, the navigation stick extends vertically upward a slight distance above the top surface area. To generate left click key signals for application or system programs when depressed in a downward direction, the navigation stick is depressed downward.

16 Claims, 3 Drawing Sheets

STATIONARY ERGONOMIC MOUSE

BACKGROUND

The present invention relates to ergonomic computer pointing device. More particular, the present invention relates to the computer mouse. The computer mice normally control the on screen cursor movement of the computer. However, the growth in the use of the computer mice has created a need for ergonomic computer mice. Additionally, many users have migrated to using the wireless mouse. The present invention discloses a novel stationary ergonomic mouse.

SUMMARY

The present invention comprises a stationary ergonomic mouse for a computer system. The mouse further comprises a casing defined by an upper surface, a left side, right side, and a flat bottom surface area. The upper surface area further includes a raised crown portion dimension to accommodate the palm region of the hand. The upper surface area also includes a front section and a back section. Extending forward from the crown portion is the front section of the casing. Extending backward from the crown portion is the back section of the casing.

The present invention further comprises, a navigation stick is configured to generate precise on-screen cursor control movement key signals. The navigation stick is positioned in the upper left corner of the forward section of the casing for operation by the index finger. The navigation stick extends vertically upward a slight distance above the top surface area. To generate left click key signals for application or system programs the navigation stick is depressed downward.

The present invention further comprises a right click button configured to generate right click key signals for application programs or system programs. The right click button is positioned in the upper right corner of the forward section of the casing.

The present invention further includes a scroll button configured to generate screen scroll movement key signals for application programs or system programs. The scroll button is positioned on the left side of the casing for operation by the thumb. A power source is required to generate an electric current. A wireless or wired communication means can be used to transmit the generated key signals of the mouse to the digital computer.

One of the advantages of the present invention is to allow the user to control the precise position of the on-screen cursor. The mouse of the present invention operates in a stationary position. There is no track ball. Thus, the cursor is controlled totally by the buttons on the mouse.

DETAILED SPECIFICATION

Figure 1:
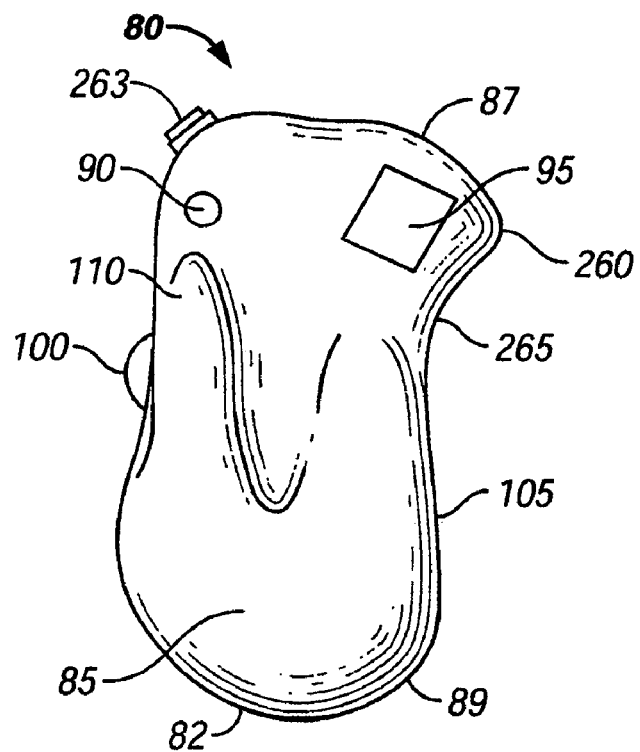
FIG. 1 is a top view of the present invention, a stationary right handed mouse.

Referring to FIG. 1, there is shown a top perspective view of the present invention, a stationary wireless mouse (80). Referring to FIG. 1, mouse (80) can be designed for a right handed person as in FIG. 1 or a left handed person as in FIGS. 1A, 2A, and 3C. As depicted in FIG. 1, the integrated pointing device is an integrated mouse (80). Referring to FIG. 1, mouse (80) has a casing defined by an upper surface (82) and a flat bottom surface area (85). In the illustrated embodiment, mouse (80) is located to the far right of the housing (40) next to the numeric key section (30). Bottom surface area (85) is generally flat and integrated into the housing (40). Upper surface area (82) has substantially an ellipsoid shape and is dimensioned to fit within the hand and configured to be gripped by the hand. At the vertex of upper surface area (82) is slightly raised crown area (85) which is contoured to accommodate the inner palm region of the hand when the hand is place in an operational mode on the mouse. Also, the bottom surface of the mouse can be layered with a non-skidding material such as rubber.

Additionally, mouse (80) requires a power source to generate an electric current. For a wireless mouse, the power source can be a lithium battery, solar power cells, or another suitable power source. For a wired mouse, standard electrical connection can be used.

Upper surface area (82) further includes a front section (87) and back section (89). Front section (87) extends and curves in a forward direction from crown area (85) to the frontal curved edge of the upper surface (82). Back section (89) extends and curves in a downward direction from crown (85) to the back curved edge of upper surface area (82). As shown, the back curved edge of upper surface area (82) is contoured to accommodate the distance of the lower palm region of the hand when the hand is place in an operational mode on the mouse. The lower curved back fans outward more than the traditional mouse to accommodate the contour of the lower palm region when the hand is placed in an operational mode on the mouse.

The integrated mouse (80) further comprises a navigation stick (90) for generating precise cursor control movement key signals. Navigation stick (90) is positioned on the top left corner of the front section (87) of upper surface area (82) below the index finger, and extends vertically upward a short distance above the upper surface area (82). A cap cover encompasses navigation stick (90). Cup (92) is defined by a recess situated within the cap at the top of navigation stick (90). Cup (92) is contoured to accommodate the tip of the index finger. Additionally, the navigation stick (90) is configured to generate left click key signals when depressed downward. In operation, the tip of the index finger would be placed within cup (92). Then, navigation stick (90) would be depressed downward.

The upper surface area (82) further comprises an index finger rest (105) extending downward from the navigation stick (90) to crown area (85). The index finger rest (105) further comprises a second raised section contoured to accommodate the area underneath the index finger. The navigation stick (90) is positioned above the index finger (105) to allow the index finger to operate navigation stick (90) in a natural position.

Typically, by moving the mouse on the surface, the user controls an on-screen cursor. There is no define limits to the mouse's movement and the mouse placement does not map directly to a direct specific screen location. With the present invention, the mouse does not have a tracking ball. Navigation stick (90) is used to provide precise on-screen cursor control movement. In use, when the navigation stick (90) is moved up, down, left, and right, the cursor on the screen moves up, down, left, and right. With the present inventor, the cursor does not move relentlessly on the screen. The user controls precisely where on the screen the cursor moves. Additionally, in some embodiments cursor can be controlled to move diagonally.

The integrated mouse (80) further comprises a right click button (95) configured to generate right click key signals for application programs or system programs executing in the digital computer. Right click button (95) is positioned on the top right corner of the front section (87) of upper surface area (82) near the middle finger. Thus, right click button (95) can be operated by the middle finger which relieves the index finger to control the operation of the navigation stick (90).

The integrated mouse (80) further comprises a scroll button (100) configured to generate screen scroll movement key signals for application programs or system programs executing in the digital computer. Scroll button (100) is positioned on the left side of the upper surface area (82) for operation by the thumb. Scroll button (100) can be oriented vertically or horizontally along the left side.

Scroll button (100) can be used to implement a screen jump capability. When scroll button (100) is depressed, the cursor moves to the center of the computer screen. If scroll button (100) is depressed simultaneously with navigation stick (90) being moved to the left, the cursor moves to the far left of the computer screen. If scroll button (100) is depressed simultaneously with navigation stick (90) being moved to the right, the cursor moves to the far right of the computer screen. If scroll button (100) is depressed simultaneously with navigation stick (90) being moved downward, the cursor moves to the bottom of the computer screen. If scroll button (100) is depressed simultaneously with navigation stick (90) being moved upward, the cursor moves to the top of the computer screen. If scroll button (100) is depressed simultaneously with navigation stick (90) being moved diagonally, the cursor moves diagonally along of the computer screen.

The right side of the integrated mouse (80) of the present invention further comprises a small frontal lobe (260) protruding from the upper edge of the right side. The lobe transitions into a sloping curvature support rest member (265). The curvature in the right side extends from lobe (260) to near the crown area (85). The support rest member (265) is contoured to accommodate the area underneath the ring finger and the little finger.

The left side of integrated mouse (80) further comprises a small lobe (270) protruding from the lower edge of the left side. The lobe (270) transitions into a sloping curvature thumb rest member (275). The curvature extends upward from lobe (270) to the scroll button (100). The thumb rest member (270) is contoured to accommodate the area underneath the thumb as well as the palm region under the thumb.

Figure 3:
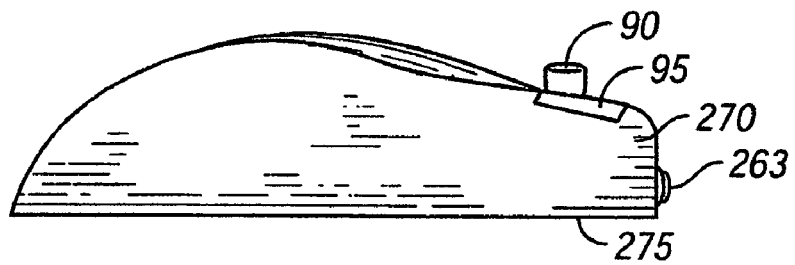
FIG. 3 is a right side view of the present invention.
Figure 3A:
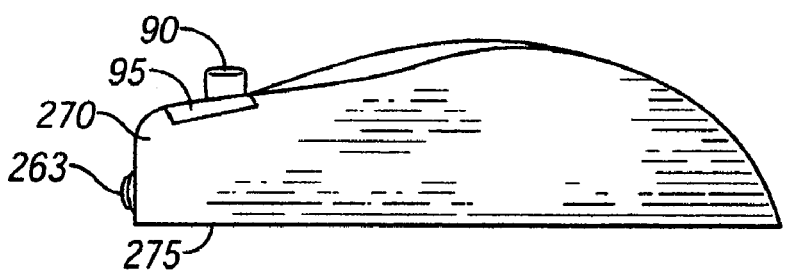
FIG. 3A is a right side view of the present invention for a right handed mouse.
Figure 3B:
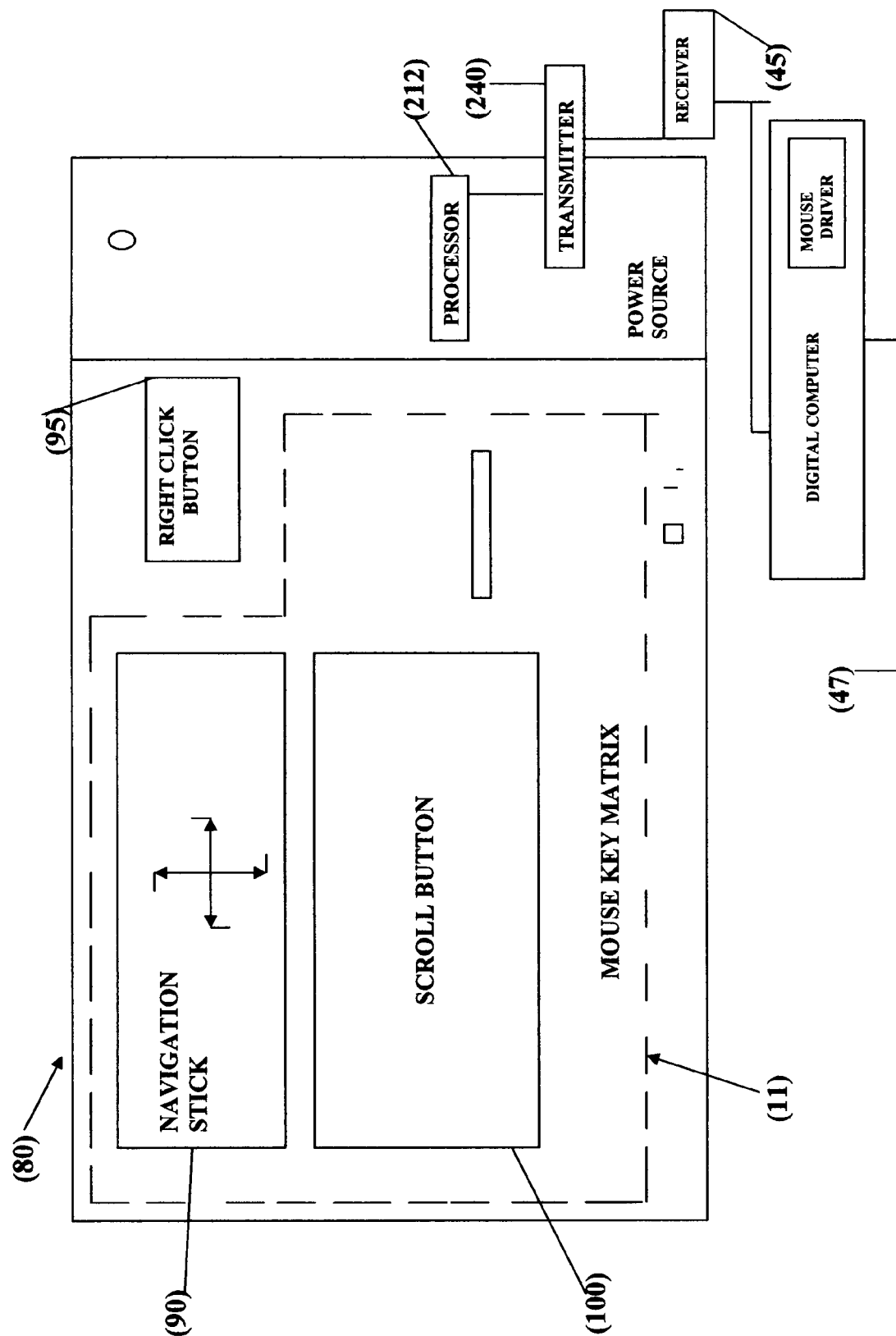
FIG. 3B is an internal configuration view of the present invention.

Referring to FIG. 3B there is shown an illustration of one embodiment of the internal configuration of mouse (80). Key matrix (200) supports the navigation stick (90), right click button (95), the scroll key button (100). The key matrix (200) is a grid of circuits lying underneath navigation stick (90), right click button (95), and the scroll key button (100). Underneath navigation stick (90), right click button (95), the scroll key button (100) the circuit is broken. When a key is pressed, the circuit is connected allowing a tiny amount of current to flow. Mouse (80) can have a processor (212) that has the capability of continuously monitoring the flow of current in the key matrix (212). When processor (212) notices a key current flow, processor (212) determines the location of the key and transmits the appropriate numeric code to the digital computer via transmitter (240). Transmitter (240) can communicate with receiver (45) which in turn communicates with the mouse driver (47).

Figure 1A:
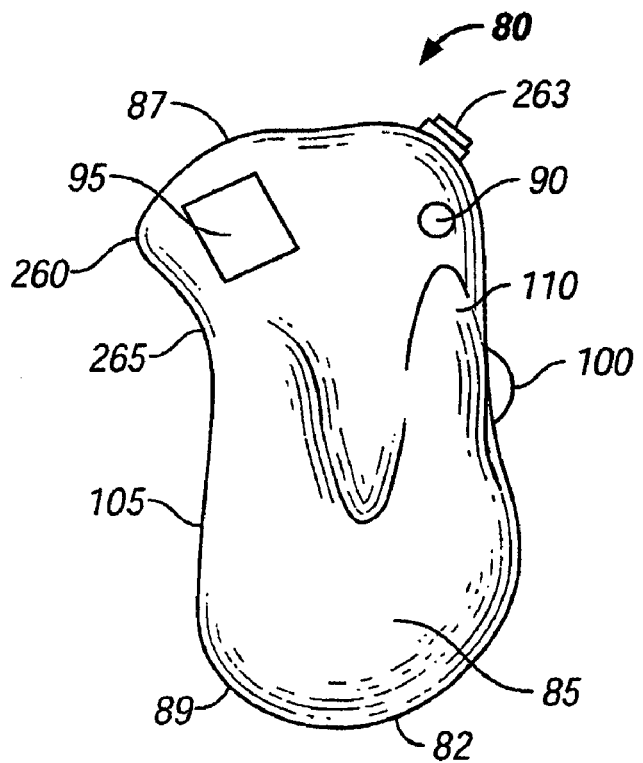
FIG. 1A a top view of the present invention, a stationary left handed house.
Figure 2:
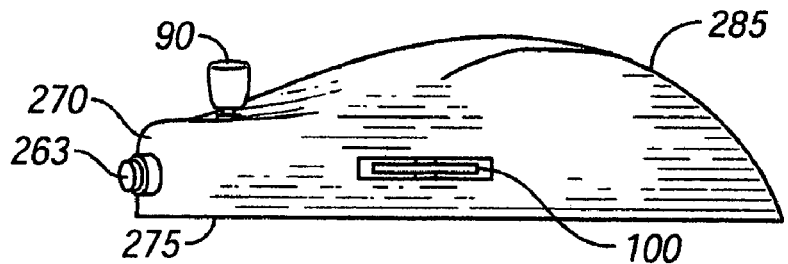
FIG. 2 is a left side view of the present invention.
Figure 2A:
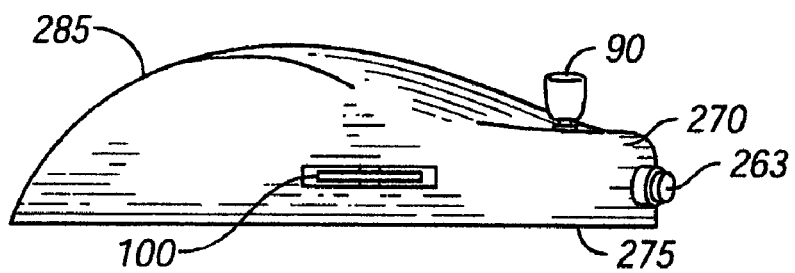
FIG. 2A is a left side view of the present invention for a left handed mouse.

Referring to FIGS. 1A, 1B, and 1C, there is shown an illustration of one embodiment of a left handed mouse. In this embodiment, the positions of the button components (i.e. the navigation stick (90), right click button (95), and scroll button (100)) upon the upper surface area (82) of mouse (80) are swapped. However, the mouse functions the same.

Referring to FIG. 3, there is shown a wireless remote control button (263) is situated in front of the mouse. In one aspect of the present invention, when remote control button (263) is depressed, processor (212) (in FIG. 1A) detects the depression key signal and generates an infrared light. A sensor in the computer would detect the infrared light and automatically boot up the operating system of the digital computer.

What is claimed is:

1. A stationary mouse for a computer system, the mouse further comprising: a casing defined by an upper surface, a left side, right side, and a flat bottom surface area; the upper surface area including a vertex point, a front section and a back section; the upper surface area dimensioned to fit within the hand of a user; a raised crown area located at the vertex point contoured to accommodate the inner palm region of the hand; the front section being curved and extending forward from the crown area to a front curved edge, the back section being curved and extending backward from the crown area to the back curved edge, the back curved edge contoured to accommodate the length of the lower palm region while the user hand is in an operating position on the mouse; a navigation stick configured to generate precise screen cursor control movement key signals without utilizing a track ball disposed within the bottom surface area and without a supporting left mouse button, the navigation stick positioned in the upper left corner of the forward section for operation by the index finger, the navigation stick extending vertically upward a slight distance above the top surface area; the navigation stick configured to generate left click key signals for application or system programs when depressed in a downward direction; a right click button configured to generate right click key signals for application programs or system programs, the right click button positioned in the upper right corner of the forward section for operation by the middle finger; a scroll button configured to generate screen scroll movement key signals for application programs or system programs, the scroll button being laterally positioned within a curved recessed portion on the left side of the casing for operation by the left thumb while in a natural position; a power source for generating an electric current; and a communication means for transmitting the generated key signals of to the digital computer.

2. The mouse of claim 1 wherein the navigation stick further comprises: a cup defined by a recess located on the top of the navigation stick; and the recess dimensioned to accommodate the tip of the index finger.

3. The mouse of claim 1 wherein the scroll button is vertically oriented.

4. the mouse of claim 1 wherein the scroll button is horizontally oriented.

5. The mouse of claim 1 wherein the navigation stick is configured to generate left, right, up, and down key signals for screen cursor movement.

6. The mouse of claim 5 wherein the navigation stick is configured to generate diagonal key signals for screen cursor movement.

7. The mouse of claim 1 wherein the communication means further comprises: a wireless transmitter in communication with a wireless receiver; the transmitter operationally configured within the casing to send the key signals generated by the mouse to the receiver; and the receiver operationally connected to a communication port of the digital computer, the receiver operationally configured to receive the key signals sent by the transmitter.

8. The mouse of claim 7 wherein the transmitter and the receiver communicate through infrared communication signals.

9. The mouse of claim 8 wherein the transmitter and the receiver communicates through radio communication signals.

10. The mouse of claim 1 wherein the casing further comprises: an index finger rest defined by a raised section extending from the navigation stick to the crown; and the raised section dimensioned and positioned to accommodate the area underneath the index finger while the hand is in an operating position on the mouse.

11. The mouse of claim 1 wherein the right side of the upper surface area further comprises: a small lobe protruding from the upper edge of the right side; the lobe transitioning into a sloping curvature support rest member, the curvature extending from the lobe downward to near the crown; and the support rest member dimensioned to accommodate the area underneath the ring finger and the little finger while the hand is in an operating position on the mouse.

12. The mouse of claim 1 wherein the left side of the upper surface area further comprises: a small lobe protruding from the lower edge of the left side; the lobe transitioning into a sloping curvature thumb rest member, the curvature extending from the lobe upward to the scroll button; and the thumb rest member contoured to accommodate the area underneath the thumb as well as the palm region below the thumb while the hand is in an operating position on the mouse.

13. The mouse of claim 1 wherein the bottom surface area is layered with a non-skid material.

14. The mouse of claim 1 further comprising: a cursor screen jump mechanism for jumping to a predetermined screen location; and the jump mechanism integrated into the operation of the scroll button.

15. The mouse of claim 1 further comprising: a remote control mechanism strategically placed on the tipper surface of the casing; and the mechanism operationally configured to remotely communicate with the digital computer such that the computer can be remotely booted into operation.

16. A stationary left-handed mouse for a computer system, the mouse further comprising: a casing defined by an upper surface, a left side, right side, and a flat bottom surface area; the upper surface area including a vertex point, a front section and a back section; the upper surface area dimensioned to fit within the hand of a user; a raised crown area located at the vertex point contoured to accommodate the inner palm region of the hand; the front section being curved and extending forward from the crown area to a front curved edge, the back section being curved and extending backward from the crown area to the back curved edge, the back curved edge contoured to accommodate the length of the lower palm region while the user hand is in an operating position on the mouse; a navigation stick configured to generate precise screen cursor control movement key signals, the navigation stick positioned in the tipper right corner of the forward section for operation by the index finger, the navigation stick extending vertically upward a slight distance, above the top surface area; the navigation stick configured to generate left click key signals for application or system programs when depressed in a downward direction without utilizing a track ball disposed within the bottom surface area and without a supporting left mouse button; a right click button configured to generate right click key signals for application programs or system programs, the right click button positioned in the upper left corner of the forward section for operation by the middle finger, a scroll button configured to generate screen scroll movement key signals for application programs or system programs, the scroll button being laterally positioned within a curved recessed portion on the right side of the casing for operation by the left thumb while in a natural position; a power source for generating an electric current; and a communication means for transmitting the generated key signals of to the digital computer.

\* \* \* \* \*